United States Patent
Ziavras

(12) 
(10) Patent No.: US 6,484,608 B1
(45) Date of Patent: Nov. 26, 2002

(54) METHOD AND APPARATUS FOR PROVIDING TWO AXIS MOTION WITH A SINGLE DRIVE DEVICE

(75) Inventor: John Ziavras, Hermosa Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/597,851

(22) Filed: Jun. 20, 2000

(51) Int. Cl.[7] .............................................. G05G 11/00
(52) U.S. Cl. ...................... 74/810.1; 74/490.09; 74/724
(58) Field of Search ........................... 74/810.1, 490.09, 74/724, 665 L, 665 Q, 89.14, 665 GA, 665 GD, 665 N, 665 C

(56) References Cited

U.S. PATENT DOCUMENTS 5,159,854 A * 11/1992 Mino et al. ................ 74/810.1
5,503,586 A * 4/1996 Suto ........................... 446/443
5,769,748 A * 6/1998 Eyerly et al. ................... 475/5
6,036,174 A * 3/2000 Andersen ..................... 254/343
6,041,990 A * 3/2000 Chang ......................... 226/144

* cited by examiner

Primary Examiner—Saul Rodriguez
(74) Attorney, Agent, or Firm—Artz & Artz, P.C.

(57) ABSTRACT

There is disclosed a two-axis positioning mechanism including a single motor to control the position of two orthogonal axes. The motor is in communication with a first drive system to control the position of one axis and a second drive system to control the position of the other of the two axes. Also provided is a mechanically redundant positioning mechanism in which either of two motors may perform the two-axis positioning function.

20 Claims, 2 Drawing Sheets

METHOD AND APPARATUS FOR PROVIDING TWO AXIS MOTION WITH A SINGLE DRIVE DEVICE

TECHNICAL FIELD

The present invention relates generally to a positioning platform mechanism for a spacecraft. More particularly, the present invention relates to a two-axis positioning mechanism for a spacecraft that utilizes a single motor.

BACKGROUND ART

Positioning mechanisms, including two-axis positioning mechanisms are utilized on most current spacecraft. These positioning mechanisms are used to steer antennas, thrusters, momentum wheels and other devices requiring repositioning or realignment. Many current positioning platform mechanisms suffer from a variety of disadvantages.

Many positioning mechanisms utilize two or three or more motors in order to effectuate repositioning or realignment. This adds weight to the spacecraft, thus increasing its cost and also potentially decreasing the reliability.

Additionally, most of the current positioning mechanisms are heavy and/or relatively complex. Moreover, all current positioning mechanisms require a redundant system in the event the main positioning mechanism fails. It is a common practice to provide redundancy in these positioning mechanism. The redundant features may be either electrical or mechanical. Current mechanically redundant mechanisms use heavier, more complicated differential drives, floating gear drives (see for example U.S. Pat. No. 4,858,490), or three motor tripod platforms. For example, a typical redundant differential gear drive uses two motor drives per axis, for a total of four motors. These devices have complicated drive trains and are expensive and heavy.

Positioning mechanisms are also used for other applications including solar array systems in order to perform deployment and sun tracking functions. These positioning mechanisms also suffer from similar disadvantages to those outlined above. Therefore, it would be advantageous to develop an inexpensive, light, positioning mechanism that has a reliable redundant system.

SUMMARY OF THE INVENTION

Accordingly, it is an object of the present invention to provide a positioning mechanism that is lighter, smaller, less complex, and less expensive than prior positioning mechanisms.

It is a further object of the present invention to provide a positioning mechanism that has improved reliability over prior positioning mechanism.

It is a related object of the present invention to provide a positioning mechanism that has fewer electrical components and connections than prior systems.

In accordance with these and other objects of the present invention, a two-axis positioning mechanism is provided. The two-axis positioning mechanism includes a motor that effectuates the steering about a first axis and a second axis. The motor has a pinion attached to a drive shaft that simultaneously drives a first drive and a second drive. The first drive includes a first gear, a first worm shaft in communication with the first drive gear at a first end, and a first worm on the first worm shaft. The first worm communicates with a first worm wheel mounted on an output shaft. The output shaft includes a first output cam mounted thereon which effects positioning about the first axis. The second drive includes a second gear, a second worm shaft in communication with the second drive gear at a first end, and a second worm on the second worm shaft. The second worm engages a second worm wheel mounted on an output shaft. The output shaft includes a second output cam mounted thereon which effects positioning about the second axis. The first ends of each of the first worm shaft and the second worm shaft are in rotational communication with their respective drive gears through respective one-way torque transmission devices.

These and other features and advantages of the present invention will become apparent from the following description of the invention when viewed in accordance with the accompanying drawings and appended claims.

BEST MODE(S) FOR CARRYING OUT THE INVENTION

Figure 1:
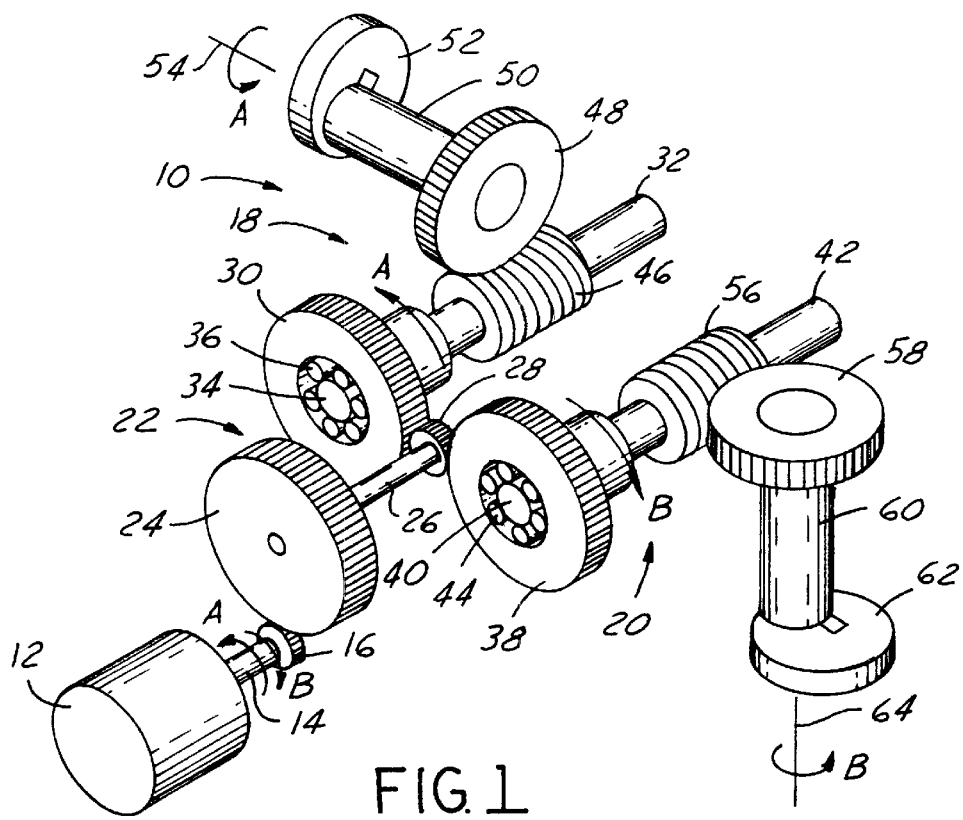
FIG. 1 is a schematic illustration of a single drive gimbal mechanism in accordance with a preferred embodiment of the present invention.
Figure 3:
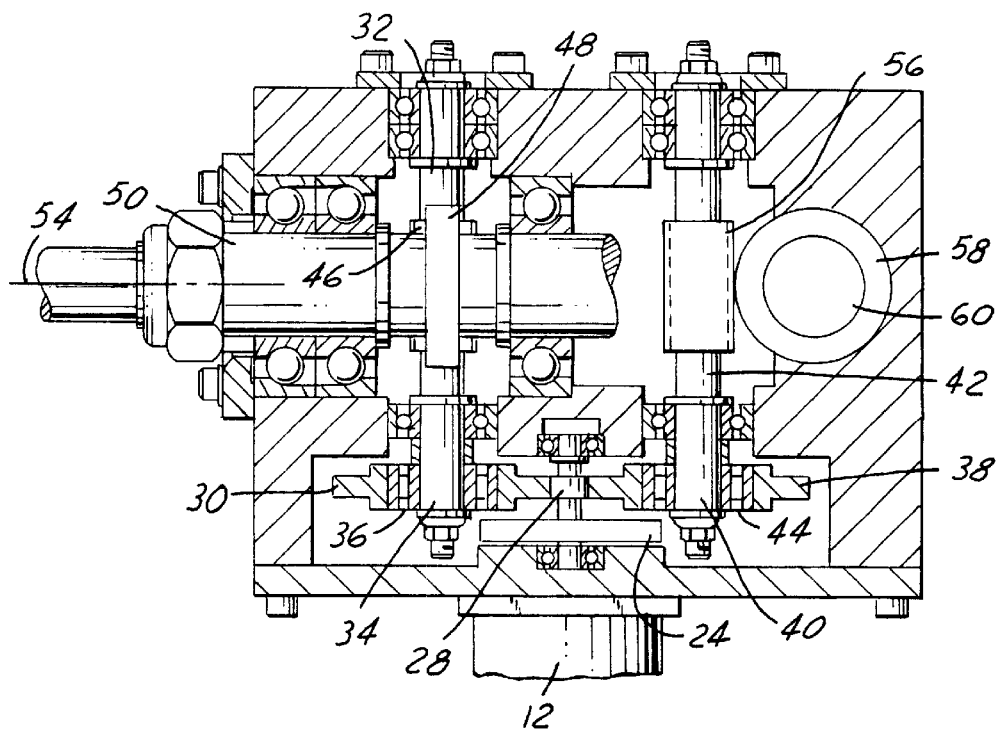
FIG. 3 is a cross-sectional view of a gearbox for a single drive gimbal in accordance with a preferred embodiment of the present invention.

Referring now to FIGS. 1 and 3 which illustrate a single drive gimbal geartrain 10 in accordance with the present invention. The single drive gimbal geartrain 10 is part of a two axis positioning mechanism which uses a single motor 12 to actuate angular motion of two independent axis. The geartrain 10 allows positioning of a first axis when the motor 12 is driven in one direction, and positioning of a second axis when the motor 12 is driven in the opposite direction. As shown in FIG. 1, when the motor 12 is driven in the direction of the arrow A, certain components are driven as indicated by the arrows designated A. Similarly, when the motor 12 is driven in the direction in the direction of arrow B, certain components are driven as indicated by the other arrows designated B.

The single drive gimbal geartrain 10 may be used on any spacecraft. Applications for the disclosed single drive gimbal geartrain include steering antennas, thrusters and momentum wheels. The disclosed single drive gimbal may also be used in any application requiring repositioning or realignment such as is required on typical communications spacecraft. Additionally, the present single drive gimbal geartrain may be used on various reflector or sub-reflector positioning applications. It should be understood that the present invention may also be utilized with a variety of other applications as will be readily understood by one of ordinary skill in the art.

The motor 12 has a drive shaft 14 extending therefrom with a motor pinion 16 secured to the drive shaft 14. The motor may be driven in either a clockwise direction, as indicated by Arrow A or a counter-clockwise direction as indicated by Arrow B. The motor 12 is preferably a stepper motor. Any other rotary input device may alternatively be utilized. The motor pinion 16 is rotated by the motor 12 and drives a first drive, as generally indicated by reference number 18 and a second drive, as generally indicated by reference number 20. The motor pinion 16 preferably drives the first drive 18 and the second drive 20 simultaneously.

Figure 2:
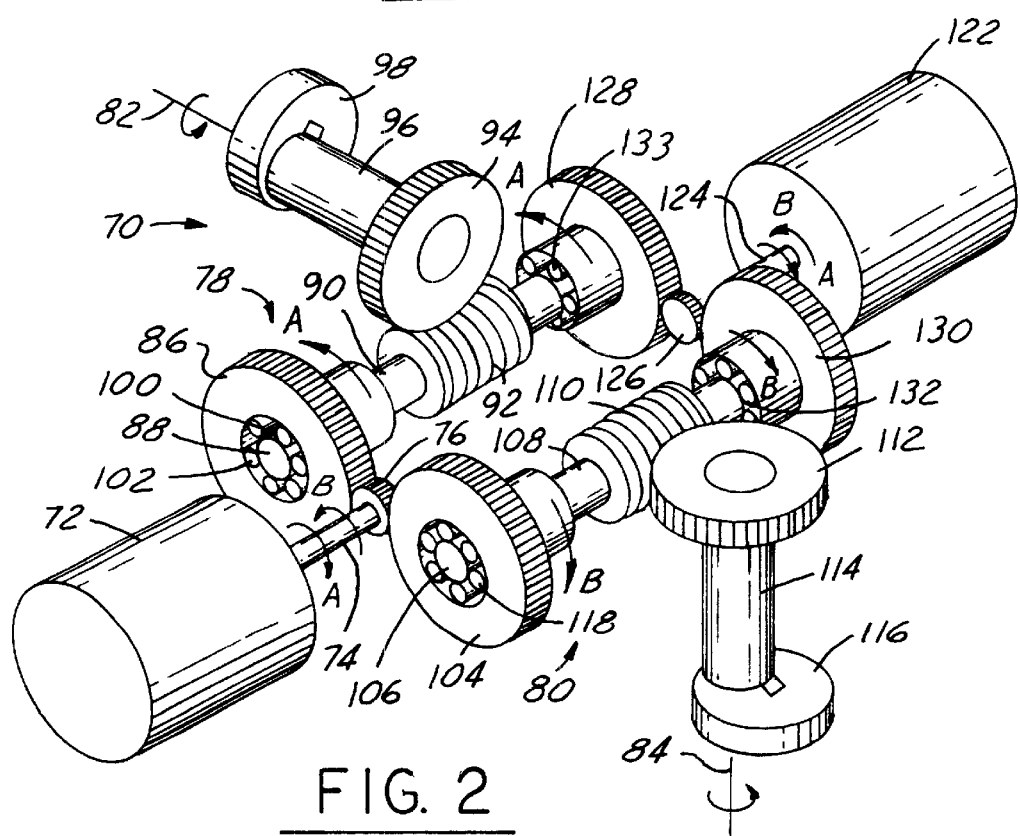
FIG. 2 is a schematic representation of the geartrain of a dual drive mechanically redundant mechanism in accordance with a preferred embodiment of the present invention.

As shown, in FIGS. 1 and 3, an intermediate gearset 22 is utilized to transmit torque from the motor pinion 16 to the first and second drives 18, 20. The intermediate gearset 22 includes an intermediate drive gear 24 positioned on one end of an intermediate shaft 26. The motor pinion 16 contacts and meshes with the intermediate gear 24 to cause rotation thereof. An intermediate pinion 28 is preferably positioned on the opposing end of the intermediate shaft 26 from the intermediate gear 24 and engages the first drive 18 and the second drive 20. It should be understood that the intermediate gearset 22 may be omitted and the motor pinion 16 may directly contact the first and second drive 18, 20 (FIG. 2).

The first drive 18 includes a first drive gear 30, which engages the intermediate pinion 28, and a first worm shaft 32, which is in rotational communication with the first drive gear 30 at a first end 34. The first drive gear 30 is preferably mounted onto the first worm shaft 32 via an overrunning clutch 36 which allows for the transmission of torque from the outer race to the first worm shaft 32 only in one direction. As shown, when the first drive gear 30 is driven in the direction of the arrow A, the first worm shaft 32 is driven. When the first drive gear 30 is driven in the opposite direction, it spins freely on the first worm shaft 32 as controlled by the overrunning clutch. The first worm shaft 32 is therefore driven only in the direction shown by the arrow A. While an overrunning clutch is shown in the drawings, other drive components which provide one-way torque transmission may be utilized such as a ratchet clutch or one or more bands.

The second drive 20 includes a second drive gear 38, which is also in communication with the intermediate pinion 28, and a second worm shaft 40, which is in rotational communication with the second drive gear 38 at a first end 40. The second drive gear 38 is mounted on a first end 40 of a second worm shaft 42. An overrunning clutch 44 or other one-way torque device is preferably disposed at the connection of the second drive gear 38 and the second worm shaft 42 to effectuate rotation of the second worm shaft 42. Because the one-way torque device allows for transmission of torque from the second drive gear 38 to the second worm shaft 42 in only one direction, the second worm shaft 42 is driven only when the second drive gear 38 is driven in a direction indicated by the arrow B.

The first worm shaft 32 has a first worm 46 thereon, which when the worm shaft 32 is rotated in the direction as indicated by the Arrow A, will cause a first worm wheel 48, mounted on a first output shaft 50, to rotate. The first worm wheel 48 is preferably mounted on one end of the first output shaft 50 while a first output cam 52 is mounted at the other end causing the first gearbox axis, generally indicated by reference number 54, to be appropriately rotated.

Similarly, the second worm shaft 42 of the second drive 20 has a second worm 56 thereon which communicates with a second worm wheel 58. The second worm wheel 58 is mounted on one end of a second output shaft 60 and a second output cam 62 is mounted on the other end of the second gearbox output shaft 60 in order to cause rotation about a second gearbox output axis, generally indicated by reference number 64. While the disclosed axis actuators are shown and described as cams, other arrangements that transform rotary motion to oscillating motion, including linkages, may also be utilized. Output cams 52 and 62 each actuate one of two orthogonal mechanism positioning axes, as is discussed in more detail below.

In operation, when the motor 12 is driven in the direction of the arrow A, it actuates the first output cam 54 while when the motor 12 is driven in the direction of the arrow B, it actuates the second output cam 62. The mechanism's two positioning axes are actuated as followers on cams 52 and 62 respectively. The continuous rotary input motion is thus converted into reciprocating angular output motion. This allows each positioning axis to reach any position within its travel by driving in a single direction.

One application of the present invention is to perform solar array deployment and sun tracking with a single motor or with two motors where both functions have redundant drives. The present positioning mechanism may also be used in applications requiring scan and tilt motion. Examples include scanning sensors and radar antennas. In these applications, the output motion may be oscillating or rotating on both axes or rotating on one while oscillating on the other.

FIG. 2 illustrates a dual drive mechanically redundant geartrain 70 in accordance with the present invention. The dual drive geartrain 70 includes a primary motor 72 having a drive shaft 74 extending therefrom. The drive shaft 74 has a primary pinion 76 mounted thereon which engages a first drive 78 and a second drive 80 to control the rotation of the drives 78, 80 about respective axis of rotations, as generally indicated by reference number 82 and reference number 84 respectively.

The first drive 78 includes a primary drive gear 86 which is mounted on a first end 88 of a first worm shaft 90. The first worm shaft 90 has a first worm 92 thereon which is in communication with a first worm wheel 94. The first worm wheel 94 is mounted on a first output shaft 96 and has a first output cam 98 mounted opposite the first worm wheel 96 to control the positioning of the first of the two orthogonal axes. The first drive gear 86 preferably has a bore 100 formed therein for receipt of the first end 88 of the first worm shaft 90. An overrunning clutch 102 preferably provides rotational communication between the first worm shaft 90 and the first drive gear 86 such that the first worm shaft 90 will be driven only when the first drive gear 86 is driven in the direction indicated by the arrow A. It should be understood that any other one-way torque device may be utilized instead of an overrunning clutch.

The second drive 80 includes a primary drive gear 104 which is mounted on a first end 106 of a second worm shaft 108. The second worm shaft 108 has a second worm 110 thereon which is in communication with a second worm wheel 112 to effectuate rotation thereof. The second worm wheel 112 is mounted on a second output shaft 114 having a second output cam 116 positioned opposite the second worm wheel 112 to effectuate positioning of the second of the two orthogonal axes. An overrunning clutch 118 or other one-way torque device provides rotational communication between the second worm shaft 108 and the second drive gear 104 such that the second worm shaft 108 is driven only when the second drive gear 104 is driven in the direction indicated by the arrow B. The use of the worm 92, 110 in the gear and the worm wheels 94, 112 prevents backdriving of the device and also provides self-locking capability.

The dual drive gimbal geartrain 70 includes a redundant or backup motor 122. The redundant motor 122 has a drive shaft 124 extending therefrom. The drive shaft 124 has a redundant pinion 126 mounted thereon which engages a redundant first and second drive gears 128, 130 respectively. The redundant first drive gear 128 is mounted on the first worm shaft 90 opposite the first drive gear 86. The redundant second drive gear 130 is mounted on the second worm shaft 108 opposite the second drive gear 104. Each of the first and second redundant drive gears 128, 130 is preferably mounted on the respective worm shafts 90, 108 by a respective one-way torque device 132, 133 such as an overrunning clutch.

The overrunning clutches, 102 and 133 are installed on worm shaft 90 such that torque may be transmitted from either of gears 86 or 128 to shaft 90 in the direction indicated by arrow A. When gears 86 or 128 are driven in the direction opposite arrow A, they spin freely on shaft 90. When shaft 90 is driven in direction A by gear 86, the overrunning clutch 133 does not allow torque to be transmitted to gear 128. Similarly, when shaft 90 is driven by gear 128 in direction A, the overrunning clutch 102 prevents torque transmission to gear 86. With this arrangement, use of either the primary motor, 72 or the redundant motor, 122 does not require backdriving the non-operational motor. The description above describes the operations of one axis only. It will be understood that the operation of the second axis is similar and does not need to be described in detail.

Through this configuration, a mechanically redundant two-axis positioning mechanism is disclosed in which two motors are used to provide mechanically redundant two-axis positioning. Thus, if the primary motor 72 was to fail for any reason, the redundant motor 122 can be utilized to position the first axis 82 and the second axis 84 in the same manner, as described above in connection with the primary motor. Additional electrical redundancy may be provided by motors with dual windings.

Figure 4A:
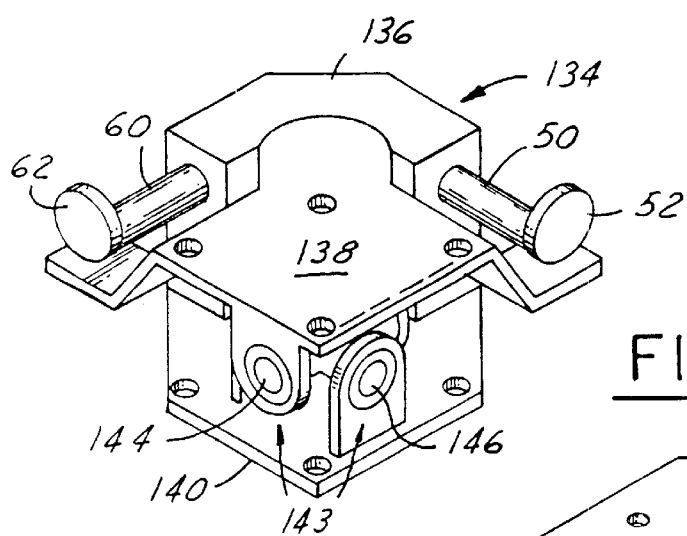
FIG. 4(a) is a perspective view of a first positioning mechanism in accordance with a preferred embodiment of the present invention.
Figure 4B:
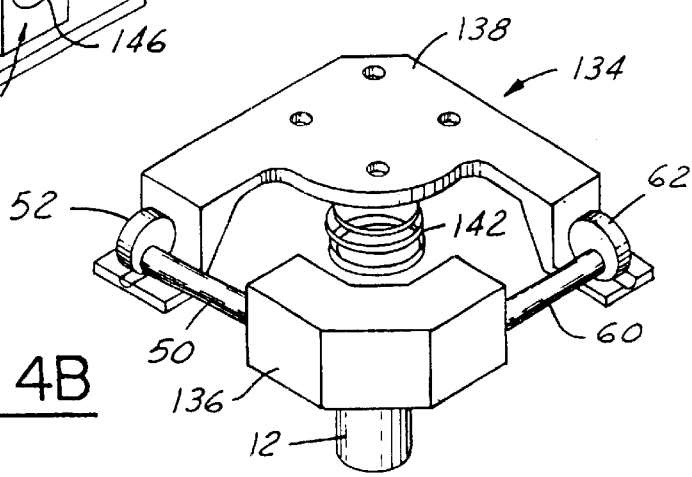
FIG. 4(b) is a perspective view of a second positioning mechanism in accordance with a preferred embodiment of the present invention.

FIGS. 4(*a*) and 4(*b*), illustrate a two-axis positioning mechanism 134 using the single drive gimbal geartrain 10 of FIG. 1. It will be understood from the foregoing how a dual drive gimbal can also be similarly configured. The positioning mechanism 134 includes a gearbox 136 that houses the gimbal geartrain. The gimbal geartrain is driven by the motor 12, as is discussed above. The motor 12 causes the first output cam 52 and the second output cam 62 to rotate. As shown, the first and second output cams 52, 62 are positioned at 90° with respect to each other. While the cams 52, 62 are shown positioned at 90°, they may be positioned at a variety of other angles. The mechanism 145 includes a payload interface 138, such as for receipt of an antenna and a base 140. A universal joint 143 allows independent positioning about two axes 144, 146. A preload spring 142 acts between base 140 and payload interface 138 to maintain contact between cams 52, 62 and their respective follower surfaces on 138. The spring 142 also preloads the geartrain and universal joint 143. It should be understood that while universal joints are disclosed, they are not required and other known mechanism, such as ball and sockets may be utilized.

Having now fully described the invention, it will become apparent to one of ordinary skill in the art that many changes and modifications can be made thereto without departing from the spirit or scope of the invention as set forth herein.

What is claimed is:

1. A single drive gimbal geartrain comprising:
    a motor having a drive shaft extending therefrom;
    a pinion in communication with said drive shaft for rotation thereof;
    a first drive in communication with said pinion, said first drive comprising a first gear, a first worm shaft in communication with said first gear at a first end of said first worm shaft, said first worm shaft in communication with a first worm wheel to drive a first output cam and deploy a first axis; and
    a second drive in communication with said pinion, said second drive comprising a second gear, a second worm shaft in communication with said second gear at a first end of said second worm shaft, said second worm shaft in communication with a second worm wheel to drive a second output cam and deploy a second axis.

2. The single drive gimbal geartrain as recited in claim 1, wherein said first axis is positioned orthogonal to said second axis.

3. The single drive gimbal geartrain as recited in claim 2, further comprising:
    a first overrunning clutch positioned at said first end where said first gear communicates with said first worm shaft.

4. The single drive gimbal geartrain as recited in claim 3, further comprising:
    a second overrunning clutch positioned at said second end where said second gear communicates with said second worm shaft.

5. The single drive gimbal geartrain as recited in claim 2, wherein said motor is a stepper motor.

6. The single drive gimbal geartrain as recited in claim 2, further comprising:
    a second motor in communication with said first drive and said second drive in the event said first motor fails.

7. The single drive gimbal geartrain as recited in claim 2, wherein said geartrain has an electrical redundant system in the event said first motor fails.

8. The single drive gimbal geartrain as recited in claim 2, further comprising:
    an intermediary gear set including an intermediary gear mounted on one end of an output shaft and an intermediary pinion mounted on the other end of said output shaft and wherein said intermediary gear is driven by said pinion which is mounted on said drive shaft and said intermediary pinion drives said first drive and said second drive.

9. A two-axis positioning mechanism, comprising:
    a primary motor having a drive shaft extending therefrom;
    a first drive in communication with said primary motor, said first drive including a first drive gear in mechanical communication with said drive shaft and a first worm shaft having one end in communication with said first drive gear;
    a first worm wheel in communication with said first worm shaft;
    a first output cam in communication with said first worm wheel to drive a first axis;
    a second drive in communication with said primary motor, said second drive including a second drive gear in mechanical communication with said drive shaft and a second worm shaft having one end in communication with said second drive gear;
    a second worm wheel in communication with said second worm shaft; and
    a second output cam in communication with said second worm wheel to drive a second axis.

10. The two-axis positioning mechanism of claim 9, wherein said primary motor is a stepper motor that can drive said shaft in either a clockwise or a counter-clockwise direction.

11. The two-axis positioning mechanism of claim 9, wherein said first drive gear has a bore formed therein for receipt of an overrunning clutch which engages said one end of said first worm shaft.

12. The two-axis positioning mechanism of claim 11, wherein said second drive gear has a bore formed therein for receipt of an overrunning clutch which engages said one end of said second drive shaft.

13. The two-axis positioning mechanism of claim 9, wherein said first axis is positioned orthogonal to said second axis.

14. The two-axis positioning mechanism of claim 9, wherein said first drive further comprises a first redundant drive gear positioned on said drive shaft on the opposite end of said first drive gear; and wherein said second drive further comprises a second redundant drive gear positioned on said drive shaft opposite said second drive gear.

15. The two-axis positioning mechanism of claim 14, further comprising:

a redundant motor in communication with said first and second redundant drive gears to drive said first and second axis in the event said primary motor fails.

16. The two-axis positioning mechanism of claim 9, wherein the mechanism is incorporated into a spacecraft.

17. A single drive gimbal geartrain for a two-axis positioning mechanism comprising:

a motor having a drive shaft that is rotatable in two directions;

a first drive in rotational communication with said drive shaft, said first drive comprising a first drive gear, a first worm shaft in communication with said first drive gear at a first end of said first worm shaft, said first worm shaft in communication with a first worm wheel to effectuate the position of a first orthogonal axis;

a second drive in rotational communication with said drive shaft, said second drive comprising a second drive gear, a second worm shaft in communication with said second drive gear at a first end of said second worm shaft, said second worm shaft in communication with a second worm wheel to effectuate the position of a second orthogonal axis;

a first one-way torque device disposed at said first end of said first worm shaft and in communication with said first drive gear to position said first orthogonal axis when said drive shaft is rotated in one direction; and a second one-way torque device disposed at said first end of said second worm shaft and in communication with said second drive gear to position said second orthogonal axis when said drive shaft is rotated in an opposite direction.

18. The single drive gimbal geartrain of claim 17, wherein either said first one-way torque device or said second one-way torque device is a one-way reversible clutch.

19. The single drive gimbal geartrain of claim 17, further comprising a first output cam in communication with said first worm wheel to effectuate the position of said first orthogonal axis; and a second output cam in communication with said second worm wheel to effectuate the position of said second orthogonal axis.

20. The single drive gimbal geartrain of claim 17, further comprising:

a second motor in communication with said first and second drive in the event said first motor fails.

* * * * *